J. H. BROWN.
METHOD OF MAKING INNER TUBES FOR PNEUMATIC TIRES.
APPLICATION FILED NOV. 26, 1915.

1,217,560. Patented Feb. 27, 1917.

UNITED STATES PATENT OFFICE.

JOHN H. BROWN, OF WEST HOBOKEN, NEW JERSEY, ASSIGNOR TO C. E. BONNER, OF CHAMPAIGN, ILLINOIS.

METHOD OF MAKING INNER TUBES FOR PNEUMATIC TIRES.

1,217,560.

Specification of Letters Patent.  Patented Feb. 27, 1917.

Application filed November 26, 1915. Serial No. 63,543.

*To all whom it may concern:*

Be it known that I, JOHN H. BROWN, a citizen of the United States, and resident of West Hoboken, in the county of Hudson and State of New Jersey, have invented a new and useful Method of Making Inner Tubes for Pneumatic Tires, of which the following is a specification.

My invention relates to a method of making inner tubes for pneumatic tires, with the object in view of providing an all rubber tube having that portion toward the tread of the tire in which it is to be used under a normal compression when the tube is inflated, so that a puncture made by a nail or other article or substance will seal itself when the puncturing article or substance is withdrawn.

Figure 1:
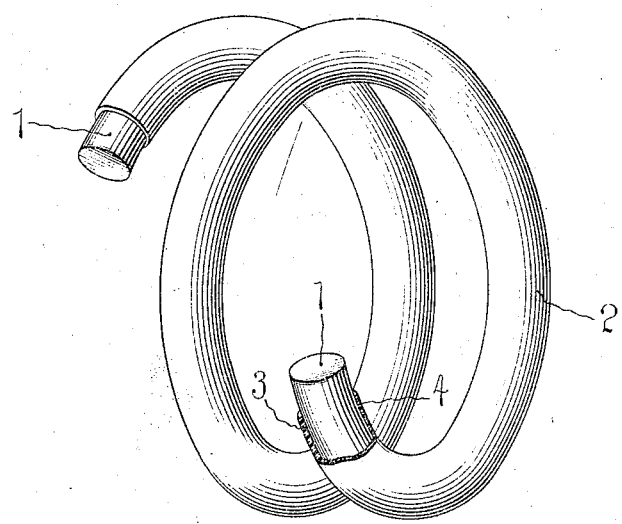
Figure 2:
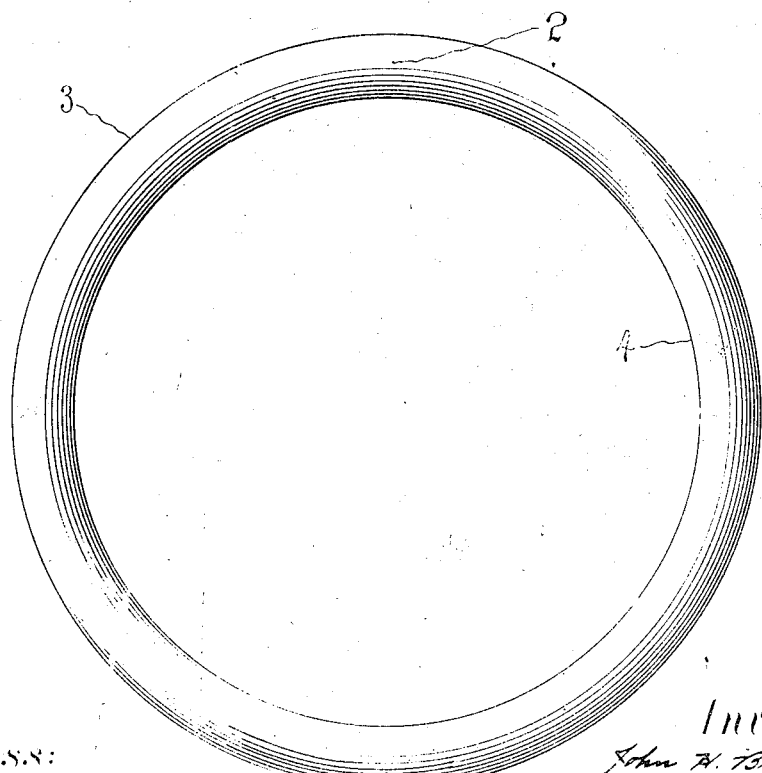

Apparatus for carrying the method into practical effect is represented in the accompanying drawings in which, Figure 1 is a view in perspective of a tube in position on a mandrel, the tube being partially broken away, and Fig. 2 is a view of the completed tube with ends connected and inflated.

The mandrel on which the tube is built up or on which it is placed after being built up on a straight mandrel and before it is vulcanized, is denoted by 1, and consists of a spiral the diameter of a coil of which is materially less than the diameter of the completed tube when the latter is inflated. In the present instance nearly two coils of mandrel are shown and the tube thereon, denoted by 2, is to be vulcanized in the form of these two coils, and after vulcanization, the said tube is to be opened out, ends connected and inflated into the form of the single annulus shown in Fig. 2.

The tube 2 is preferably built up with its portion 3 which is to lie toward the tread of the tire in which it is to be used, and which is known as its tread, thicker than its belly portion 4. After vulcanization, the tube is turned inside out, thereby producing a pronounced lateral compression and slight longitudinal compression of the thickened or tread portion of the tube, particularly the inner portion of the tread, and when the tube is opened out to straighten or rather decrease pitch of the curve in which the tube was formed, the said tread portion will be placed under a pronounced longitudinal compression, particularly the outer portion of the tread and the completed tube, when inflated, will be so far as ordinary punctures from nails and the like, self-sealing.

What I claim is:

The method of making an inner tube for pneumatic tires, consisting in vulcanizing the built up tube in the form of a curve having a sharper pitch than the curve of the completed tube, turning the vulcanized tube inside out to place its tread under lateral compression and finally opening out the vulcanized and turned tube and connecting its ends to place the tread portion under longitudinal compression when the tube is inflated.

In testimony that I claim the foregoing as my invention I have signed my name this 18th day of November 1915.

JOHN H. BROWN.